March 3, 1942. C. L. EKSERGIAN 2,274,859
RADIAL BRAKE
Filed May 7, 1940 2 Sheets-Sheet 1
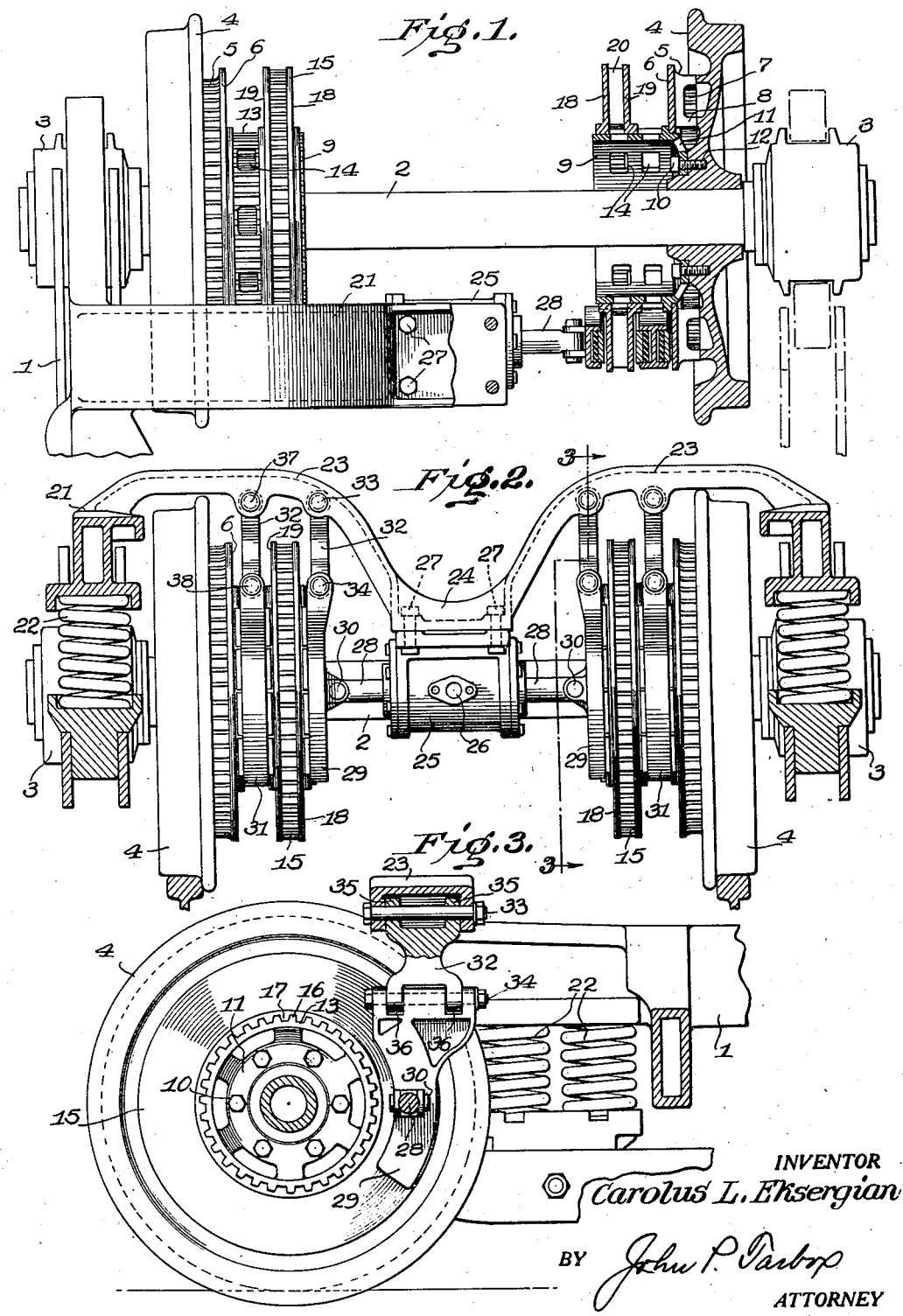
INVENTOR
Carolus L. Eksergian
BY John P. Barbor
ATTORNEY March 3, 1942.　　C. L. EKSERGIAN　　2,274,859
RADIAL BRAKE
Filed May 7, 1940　　2 Sheets-Sheet 2

INVENTOR
Carolus L. Eksergian
BY John P. Paxton
ATTORNEY

Patented Mar. 3, 1942

2,274,859

UNITED STATES PATENT OFFICE 2,274,859

RADIAL BRAKE

Carolus L. Eksergian, Detroit, Mich., assignor to Budd Wheel Company, Philadelphia, Pa., a corporation of Pennsylvania Application May 7, 1940, Serial No. 333,703

7 Claims. (Cl. 188—153)

The present invention relates to vehicle brakes of the so-called "disk" type, wherein the braking effect is secured by forcing brake shoes against the side faces of a ring or disk mounted to turn with the rotating element whose motion is to be braked.

An object of the present invention is to provide compactness, lightness and simplicity in brakes of this type, by means of novel structural arrangements of the elements thereof.

The invention contemplates providing a number of brake rings or disks adjacent each wheel, means being provided to cause the same to rotate positively with the said wheels, and in certain embodiments permitting a number of the brake rings or disks to move as a whole in a direction parallel to the axis of the wheel, suitable brake shoes being provided to cooperate with all the braking surfaces simultaneously and equally, in response to the force produced by the piston rod of the brake cylinder. The term "number" is used herein in its mathematical sense, to designate any integral number, inclusive of unity.

In the present specification, two forms of the invention are disclosed, the same being illustrated in the drawings accompanying the same and forming a part thereof.

In said drawings:

Fig. 1 is a diagrammatic fragmentary plan view, partly in horizontal section, illustrating a portion of a wheel truck to which the form of the invention preferred for passenger cars is applied;

Fig. 2 is a diagrammatic side elevation corresponding to Fig. 1, certain parts being shown in vertical section; and Fig. 3 is a fragmentary diagrammatic end elevation corresponding thereto, partly in section on the planes indicated by the broken line 3—3 of Fig. 2.

In all the figures, corresponding parts are indicated by the same reference characters.

Figure 4:
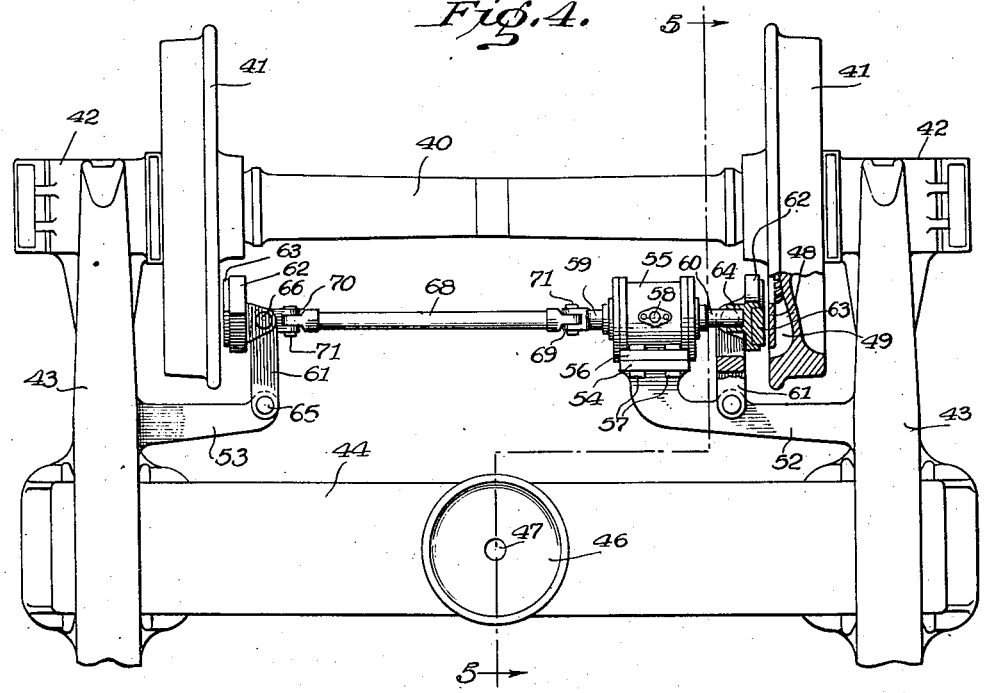
Fig. 4 is a diagrammatic fragmentary plan view, partly in section, showing a modified form of brake mechanism, particularly adapted for use on freight cars, and relatively simpler than the form disclosed in Figs. 1 to 3.

Referring first to Figs. 1, 2 and 3 of the drawings, it will be seen that the truck frame 1 includes an axle 2, mounted in the journal boxes 3 and carrying the wheels 4. Each wheel has secured thereto a brake ring 5, having a friction surface 6 extending in a plane at right angles to the axis of the wheel, suitable passages 7 for the flow of cooling air being provided so that when the structure rotates, currents of air will be produced by the vanes 8 acting as impellers of a centrifugal blower, to assist in keeping the brake ring cool in service. The brake rings 5 may be secured to the respective wheels or axles in any preferred way, but as here shown they are mounted on drums 9 of generally cylindrical shape, secured to the wheels by means of screws 10 passing through an end flange 11 of each drum, and threaded into the hub portions of the wheels as shown at 12.

Each drum 9 has a series of ribs and/or grooves forming key-ways 13 in its outer surface so that the drum resembles a spur gear in appearance, although it is not necessary that such key-ways or ribs should be provided throughout the entire outer surface of the drum or that they should be similar to one another or even symmetrically placed, since the drum acts not as gear, but merely to prevent a brake disk or ring slidably mounted thereon from rotating about its axis. Suitable apertures 14 extend through the drum 9 at more or less arbitrary locations therein, for the purpose of allowing air to flow through said drum, for reasons which will be explained presently.

A brake ring 15 is mounted on each drum 9, and is provided with cooperating key-ways in its inner portion, engaging the drum, so that such ring may slide freely along the drum, but will be prevented from rotating about such drum. This is shown clearly in Fig. 3 wherein 16 designates the keys or ribs on the drum 9, and 17 indicates the corresponding keys on the brake ring 15, which engage between those of the drum.

The brake ring 15 may have the friction surfaces 18 and 19 on its opposite faces, with braces 20 at its center portion, which also serve as vanes to provide currents of air due to centrifugal force when the brake ring is in rotation. It will be noted that some of the openings 14 of the brake drum will provide access to the space between the friction surfaces 18 and 19, regardless of the position of the sliding ring with respect to the drum, so that it will always be possible for cooling air to flow therebetween.

By providing the relatively large total friction surface, due to the increased number of such individual surfaces, it becomes possible to use brake shoes which do not cover such large areas of each individual friction surface, and thus the brake shoes 29 and 31 may be so designed that they may move vertically through a certain range without leaving the boundaries of the cooperating friction surfaces of the rings. This makes it possible to support the brake shoes directly from a portion 21 of the truck frame itself, and such construction will now be described.

The truck frame may be supported resiliently from the usual equalizer bars by means of the vehicle springs 22, so that it will have freedom of vertical motion with respect to the wheels 4 in the customary way. The cross member 21 of the frame may for example have the shape shown in Fig. 2, that is, it may be substantially horizontal at its end portions 23, with an intervening depressed portion 24.

A brake cylinder 25 having the air port 26 may be supported from the central portion 24 in any suitable manner, for example by means of the bolts 27. This cylinder is preferably of the duplex type, that is, it contains two oppositely moving pistons (not shown) each having a piston rod 28 attached thereto, so that when compressed air is admitted through the port 26, both piston rods will move outwardly.

Each piston rod has a brake shoe 29 attached thereto by means of the pin 30, thus providing a pivotal connection to each brake shoe, whereby the brake shoe may adjust itself to lie flat against the corresponding friction surface 18 when pressure is applied. An additional brake shoe 31 is located between the friction surfaces 6 and 19, and this brake shoe may be similar in general to the brake shoe 29, but differs therefrom in having two oppositely directed friction surfaces, whereas the brake shoe 29 has only a single friction surface thereon.

The brake shoe 29 may be supported by a swinging link 32, which is pivoted to the truck cross member 21 of the frame by means of the bolt or pin 33, and to the said brake shoe by the bolt or pin 34. To provide stability, the link 32 may be bifurcated at both its upper and lower ends to provide a wide bearing, as shown at 35 and 36 in Fig. 3. The brake shoe 31 may be supported in precisely the same way by another link 32, identical with the one just described, and supported pivotally on the pins 37 and 38 as shown.

It will thus be seen that the brake shoe 31 "floats" between the friction surfaces 6 and 19, while the brake ring 15 likewise "floats" between the brake shoes 31 and 29. It will be understood that springs or other means for retracting the piston rods 28 are provided within the cylinder 25, in the conventional way, so that whenever the pressure within the cylinder is released, the shoes 29 will be drawn away from their cooperating friction surfaces 18, and at such times the rings 15 and 31 will automatically disengage one another, such disengagement being facilitated and assisted by the vibrations and vertical motions imparted to the brake shoes, due to the travel of the vehicle. If desired, additional sets of "floating" brake rings and brake shoes may be provided.

Figure 5:
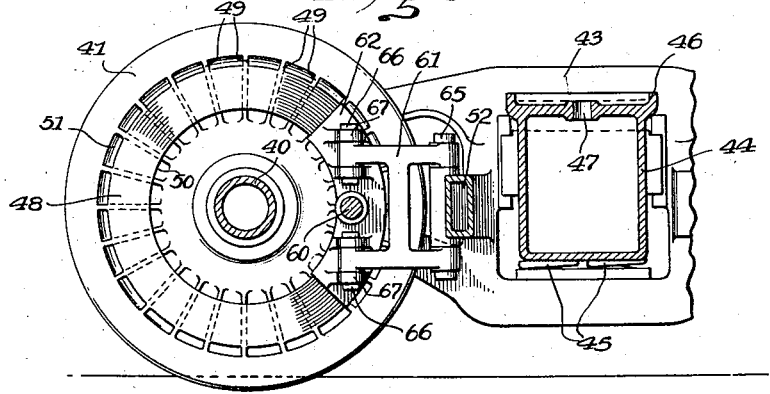
Fig. 5 is a diagrammatic fragmentary sectional side elevation corresponding to Fig. 4, the section being made on the planes indicated by the broken line 5—5 of Fig. 4.

Referring now to the form disclosed in Figs. 4 and 5, it will be seen at once from the drawings that this type of mechanism is far simpler than the one described above. This form is adequate for use on freight cars where the riding comfort of passengers is not a governing consideration.

Each axle 40 carries wheels 41, and has its ends mounted in the journal boxes 42, carried by the side frames 43 in the customary way. A bolster 44 connects these side frames and is carried on springs 45 mounted therein, as shown in Fig. 5. The bolster has the centerplate 46 with the raised rim as shown, and with the central opening 47.

Each wheel preferably carries a brake ring 48 which may be made integral with the wheel, the ring 48 being rigidly held in position by means of the ribs or vanes 49 connecting it with the body of the wheel. These ribs 49 are shown in Fig. 5 to extend substantially radially and to be spaced more or less uniformly, thus providing air passages, each passage opening at its inner end adjacent the hub of the wheel, and at its outer end adjacent the rim thereof, as shown at 50 and 51 respectively. While it is preferred to form the brake rings and the supporting ribs integral with the wheel itself, this is not in any way essential and the brake ring may be secured to the wheel or axle in any other way that may be preferred, for example, as disclosed in Fig. 1.

The brake shoe actuating mechanism is preferably supported from the side frames by any suitable brackets, such as 52 and 53. As here shown, bracket 52 carries a flange 54 at its end upon which is mounted the flange 56 of the pneumatic cylinder 55, as by the bolts and nuts 57, for example. This cylinder, like the cylinder 25 of the other form, has an air port 58, opening between two oppositely-movable pistons in the cylinder, connected respectively to the piston rods 59 and 60.

An H-shaped link 61 serves to hold the brake block 62 in proper parallelism with the brake ring 48, said brake block being arcuate as shown best in Fig. 5, and carrying a brake shoe 63. The end of the rod 60 is secured to the brake block 62 in any preferred way, here shown as a socket connection 64. It will be noted that, by virtue of the link 61, the brake block 62 may move about the pivots 65 and 66 which are pins or bolts as clearly shown in Fig. 5. In order to prevent binding during the motion of the brake blocks, the holes in the lugs 67 may be slightly elongated.

The bracket 53 supports a similar H-shaped link 61, which in turn retains the corresponding block 62 with its brake shoe 63 in proper alinement with its brake ring. Connection is provided between the piston rod 59 and the block 62 by means of a rod 68 extending from a forked end 69 on the piston rod 59 to a similar forked end 70 on the block 62, pins 71 securing these parts together, as shown. Because of the said pin connections, no elongation of the holes in lugs 66 is necessary to permit freedom of motion.

The operation of the invention will be clear from the structure disclosed. Briefly summarized, whenever compressed air or the like is admitted to the middle of the cylinder 25 through the port 26, the respective piston rods 28 will move outwardly, forcing the shoes 29 against the friction surfaces 18 of the rings 15. This will move the rings 15 outwardly, along the drums 9, until the friction surfaces 19 of said rings encounter the coacting surfaces of the brake shoes 31, whereupon such brake shoes 31 will also be moved outwardly until they bear against the friction surfaces 6 of the outer brake rings 5.

Further increase of pressure will thereupon force all these parts together, so that all the brake shoes will coact with the corresponding friction surfaces of the rings to provide the necessary braking effort. It will be seen that the forces are practically self-equalizing, because the brake shoes 31 and the brake rings 15 are free to adjust themselves in an axial direction, between the friction surfaces 6 and the brake shoes 29.

During the braking, currents of cooling air will flow adjacent the braking surfaces 6, 18 and 19, and it will be noted that even while the brakes are in engagement it will still be possible for the upper frame member 21 to continue to move vertically in response to the ordinary vibrations occurring during travel, since the brake shoes will merely slide upon the brake rings and the smoothness of the braking action will not be disturbed to any material extent.

The operation of the second form of the invention is similar in many respects to that of the preceding form. When the wheels rotate, due to motion of the vehicle, the vanes or ribs 40 will act as the impellers of a centrifugal blower, taking in air adjacent the hub of the wheel and discharging it near its rim. This current of cooling air flows in contact with the ribs and with the inner surface of the brake ring, so as to remove considerable heat.

When the brakes are to be applied, compressed air or the like is admitted to the cylinder 55 through the port 58, thereby forcing the piston rods 59 and 60 outward in opposite directions. Inasmuch as each of these rods is connected to a corresponding brake shoe, this action will force said brake shoes against the corresponding brake rings.

It will be seen that the brake applying force acts substantially in alinement with the center of area of each brake shoe, so that said shoes are thus applied uniformly against the adjacent brake rings. Since the two pistons in the cylinder 55 are of equal diameter, the braking forces produced will also be equal. Any customary means may be provided for retracting the brake shoes 63 from the brake rings, for example springs within the cylinder 55 surrounding each piston rod, and normally holding the same away from the corresponding end of the cylinder.

While two specific embodiments of the invention have been disclosed in detail, it should be understood clearly that this disclosure is given only by way of example and is highly diagrammatic in nature, since it is intended merely to illustrate the principles and general structures involved. Many parts may be omitted or modified, and many others added without departing from the spirit of the invention, which is defined solely in the following claims.

I claim:

1. A brake mechanism for railway trucks having a frame and a wheel and axle assembly supporting said frame, said mechanism comprising a pair of brake rings one secured to rotate with each of the opposed wheels of said assembly and having a radial braking face, each ring being in close adjacency to and supported laterally in the region between the outer and inner peripheries of its braking face directly from the body of its associated wheel, a pair of non-rotatable segmental brake shoe members, each carried by the frame for bodily transverse movement to and from braking engagement with one of said rings, and means for actuating said shoe members into braking engagement with their associated rings, said means comprising an expandible straight line thrust connection extending between the shoe members associated with the opposed rings and wheels and acting on said shoe members substantially in alignment with their centers of area, whereby the thrust on the opposed brake members is equalized and transmitted through them to and between the opposed wheels of said wheel and axle assembly.

2. A brake mechanism according to claim 1 in which the rings are laterally spaced from their associated wheels and supported directly from the wheel bodies, respectively, by circumferentially spaced generally radially extending vanes bridging the space between said rings and their respective associated wheels, whereby radial passages for cooling air are provided between each ring and its associated wheel body.

3. A brake mechanism for railway trucks having a frame and a wheel and axle assembly supporting said frame, said mechanism comprising a pair of brake rings one secured to rotate with each of the opposed wheels of said assembly, each ring being laterally supported and spaced from the body of its associated wheel by circumferentially spaced generally radially extending vanes, the space between the outer and inner peripheries of said rings and their associated wheel bodies being open to permit free circulation of air through the radial passageways formed by said vanes, a non-rotary brake member associated with each brake ring, means for actuating said non-rotary brake members into braking engagement with their associated brake rings, said means comprising an expandable straight-line thrust connection extending between the non-rotary members associated with the opposed rings and wheels, and means for expanding said connection.

4. A brake mechanism according to claim 3, in which the wheel bodies, their associated brake rings and vanes are integrally joined.

5. A brake mechanism according to claim 1, in which the brake shoes are each carried by the frame by unitary links pivoted to the shoes and frame, respectively, said links having spaced bearings at their pivotal connections to the shoes and frame.

6. A brake mechanism according to claim 1, in which the brake shoes are each carried by the frame by unitary links of generally H-shape pivoted to the shoes and frame, respectively.

7. A brake mechanism for railway trucks having a frame and a wheel and axle assembly supporting said frame, said mechanism comprising a pair of brake rings one secured to rotate with each of the opposed wheels of said assembly and having a radial braking face, each ring being in close adjacency to and supported laterally at numerous closely spaced points in its circumference from the body of its associated wheel, a pair of non-rotatable segmental brake shoe members, each carried by the frame for bodily transverse movement to and from braking engagement with one of said rings, and means for actuating said shoe members into braking engagement with their associated rings, said means comprising an expandable straight line thrust connection extending between the shoe members associated with the opposed rings and wheels and acting on said shoe members substantially in alignment with their centers of area, whereby the thrust on the opposed brake members is equalized and transmitted through them to and between the opposed wheels of said wheel and axle assembly.

CAROLUS L. EKSERGIAN.